United States Patent
Holemans et al.

(10) Patent No.: US 9,415,883 B2
(45) Date of Patent: Aug. 16, 2016

(54) CANISTERIZED SATELLITE DISPENSER

(71) Applicants: Walter Holemans, Washington, DC (US); Ryan Hevner, Columbia, MD (US)

(72) Inventors: Walter Holemans, Washington, DC (US); Ryan Hevner, Columbia, MD (US)

(73) Assignee: Planetary Systems Corporation, Silver Spring, MD (US)

( * ) Notice: Subject to any disclaimer, the term of this patent is extended or adjusted under 35 U.S.C. 154(b) by 231 days.

(21) Appl. No.: 14/086,573

(22) Filed: Nov. 21, 2013

(65) Prior Publication Data
US 2014/0319283 A1   Oct. 30, 2014

Related U.S. Application Data

(60) Provisional application No. 61/815,867, filed on Apr. 25, 2013.

(51) Int. Cl.
*B64G 1/64* (2006.01)

(52) U.S. Cl.
CPC .......... *B64G 1/641* (2013.01); *B64G 2001/643* (2013.01)

(58) Field of Classification Search
CPC ....................................................... B64G 1/641
See application file for complete search history.

(56) References Cited

U.S. PATENT DOCUMENTS

| | | | | |
|---|---|---|---|---|
| 2005/0045771 A1* | 3/2005 | Caldwell | ............... | B64G 1/002 244/137.4 |
| 2012/0112010 A1* | 5/2012 | Young | ................... | B64G 1/641 244/173.1 |
| 2014/0319283 A1* | 10/2014 | Holemans | .............. | B64G 1/641 244/173.3 |

FOREIGN PATENT DOCUMENTS

DE   EP2066566   *   6/2009   ............. B64G 1/641

* cited by examiner

*Primary Examiner* — Justin Benedik
(74) *Attorney, Agent, or Firm* — Robert M. McDermott

(57) ABSTRACT

A canisterized satellite dispenser includes one or more of: a pair of guide rails that eliminate the requirement of a rectangular profile for the satellite; a preload system that secures the canisterized satellite during transport and launch, and releases to deploy the canisterized satellite; a constant-force spring to provide a uniform and predictable dispensing force; an external rectangular profile in each dimension; and internal support surfaces that simplify the design of canisterized satellites, particularly those with deployable components. Each canisterized satellite includes a pair of opposing flanges on a lower portion of the satellite that ride in a channel formed by the dispenser's guide rails and restraining flanges; no other support constraints are imposed. During travel and launch, the satellite flanges are held against the restraining flanges, rigidly fixing the satellite to the dispenser until the satellite is deployed.

23 Claims, 8 Drawing Sheets

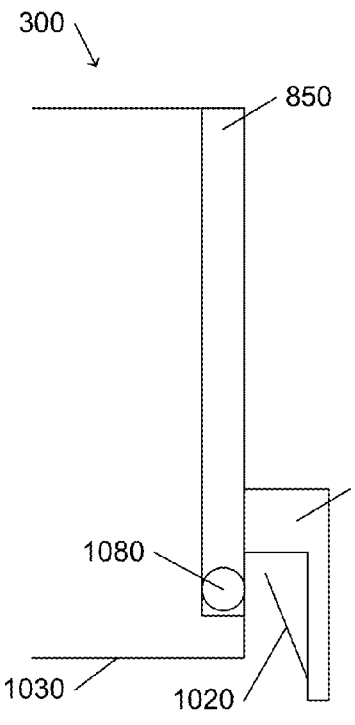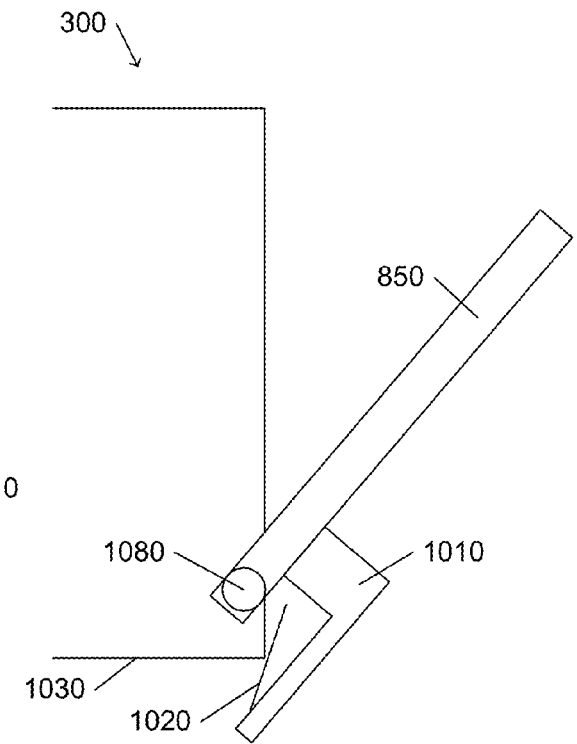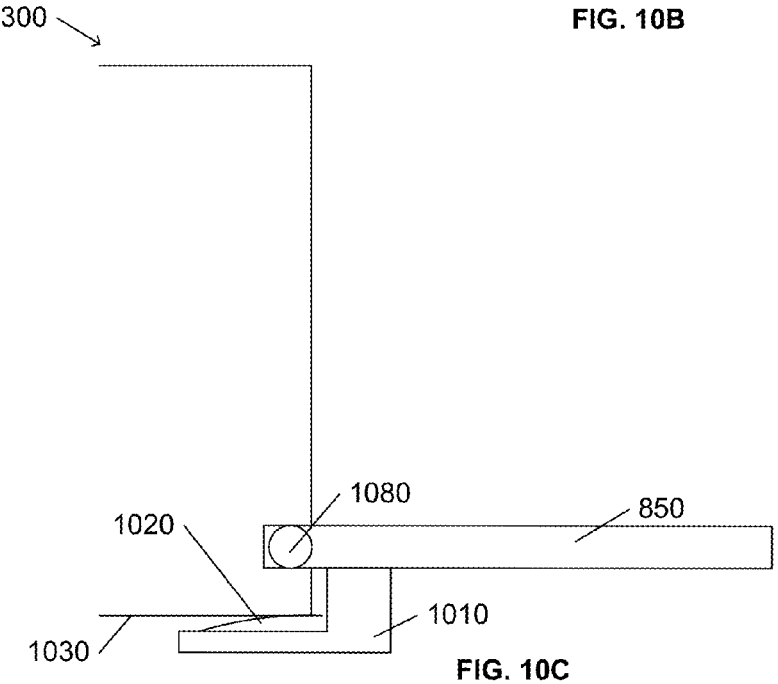
FIG. 10A
FIG. 10B
FIG. 10C

CANISTERIZED SATELLITE DISPENSER

This application claims the benefit of U.S. Provisional Patent Application 61/815,867, filed 25 Apr. 2013.

This invention was made with U.S. Government support under SBIR Contract No. FA9453-11-C-0016 awarded by the U.S. Air Force, titled "Canisterized Satellite Development for Operational Responsive Space". The U.S. Government has certain rights in the invention.

BACKGROUND AND SUMMARY OF THE INVENTION

This invention relates to the field of satellites, and in particular to a dispenser for deploying canisterized satellites, such as CubeSat, from a larger spacecraft, such as a launch vehicle, a shuttle, or a space station.

California Polytechnic State University ("Cal Poly") initiated the CubeSat concept in 1999, to enable universities to perform space science and exploration. A basic CubeSat ("1U") is a 10 cm[1] cube (one liter in volume) having a mass of not more than 1.33 kg. Other common sizes are available, including a "2U" that is 20 cm×10 cm×10 cm, and a "3U" that is 30 cm×10 cm×10 cm. Other sizes, such as a "6U" (30 cm×10 cm×20 cm), "12U" (30 cm×20 cm×20 cm), and "27U" (30 cm×30 cm×30 cm), have also been proposed.

[1] Dimensions cited herein are 'nominal'.

In a typical university scenario, students build a CubeSat to perform a particular task in space, then coordinate with launch service providers to obtain "space-available" allocation on a delivery spacecraft, such as a launch vehicle, a shuttle, or a space station. Because the CubeSats are small, they may often be placed in the spaces between the larger payloads in the delivery spacecraft.

To deploy a CubeSat in space, a dispensing device is used to 'push' the CubeSat away from the delivery spacecraft. This dispensing device is also used to transport the CubeSat and to secure it to the delivery spacecraft. Current dispensing devices include the "P-Pod" (Poly's Pico-satellite Orbital Deployer), designed by Cal Poly, and the ISIPOD deployer, designed by ISIS (Innovative Solutions In Space). The P-Pod deployer accommodates a "3U" CubeSat, or, equivalently, three "1U" CubeSats, or, one "1U" CubeSat and one "2U" CubeSat". The ISIPOD is available in a variety of sizes.

FIGS. 1A-1B illustrate a conventional P-Pod device 100. A spring-loaded door 110 secures the CubeSat(s) within the P-Pod. Upon receipt of a deployment signal, a release mechanism 120 releases the door 110, which swings open at least 90 degrees.

Within the P-Pod, a coil spring 160 is situated behind a push-plate 150. As the CubeSats are inserted into the P-Pod, the coil spring 160 is compressed. After the CubeSats are inserted into the P-Pod, the door 110 is latched, holding the coil spring 160 in compression. Access doors 130 provide access to the inserted CubeSats, and may be used, for example, to charge batteries or run diagnostic tests. Mounting brackets 180 are used to secure the P-Pod to the delivery spacecraft.

Release of the door 110 allows the coil spring 160 to push the push-plate 150 toward the door 110, resulting in the discharge of the CubeSats from the P-Pod. Four teflon coated guide rails 170 are used to facilitate a lateral discharge of the CubeSats. Nominally, the CubeSats exit the P-Pod at about 1.6 m/sec; different sized coil springs 160 may be used to increase or decrease this exit velocity. Four spring plungers (not illustrated) in the rear of the P-Pod supplement the coil spring 160.

FIG. 2 illustrates a conventional "1U" CubeSat 200. The "2U" and "3U" CubeSats have the same dimensions in the illustrated 'x' and 'y' directions, and extend further in the 'z' direction by a multiple of two and three, respectively.

Each CubeSat, regardless of size, includes rails 270 that are configured to ride on the guide rails 170 of the P-Pod 100. Spring plungers 220 are mounted on two of the rails 270, and serve to separate the CubeSats during deployment when there are multiple CubeSats within the P-Pod. Switches 230 are mounted on the remaining two rails 270, and serve to signal that the CubeSat has been deployed.

The regions 210 between the rails 270 are illustrated as plane surfaces, but will typically include components of the CubeSat 200, such as solar panels, deployable antennas, sensing instruments, and the like. The surfaces 210 merely identify the maximum extent that such components may occupy. Because the P-Pod 100 provides a sealed enclosure, the components of the CubeSat 200 need not be enclosed. Depending upon the arrangement of components within the CubeSat 200, an access panel 240 may be provided on either or both sides of the CubeSat 200, corresponding to the access panels 130 of the P-Pod 100.

The ISIPOD device includes features similar to the P-Pod 100.

Although the P-Pod and ISIPOD devices are relatively efficient and reliable, some of their features may be considered 'sub-optimal'.

For example, the requirement to provide four rails 270 on the CubeSat 200 requires the external profile of the CubeSat to be rectangular. Additionally, because the CubeSat 200 must ride the guide rails 170, there must be a gap between the extent of the rails 270 of the CubeSat 200 and the distance between the guide rails 170 of the P-Pod. Although the gap may be slight (about 0.5 mm), it allows the CubeSat 200 to vibrate within the P-Pod 100 during transport and launch, which has damaging potential and is very difficult to analytically model.

In like manner, because the guide rails 170 of the P-Pod 100 are the only surfaces that the CubeSat 200 may contact, and this contact must be via the rails 270 of the CubeSat 200, the CubeSat 200 cannot rely on the P-Pod 100 for providing other support surfaces that might simplify the mechanical design of particular CubeSats 200.

The arrangement of the release mechanism 120 above the door 110 limits the options for mounting the P-Pod 100 in the delivery spacecraft, particularly when multiple P-Pods are included in the delivery spacecraft.

The use of a coil spring 160 results in a non-uniform force being applied to the push-plate 150 as the spring 160 expands; it may also introduce an undesired torquing force, which could introduce a spin to the CubeSat as it is released.

It would be advantageous to provide a canisterized satellite dispenser that overcomes one or more of the sub-optimal features of conventional canisterized satellite dispenser, such as P-Pod and ISIPOD. It would be advantageous to provide a canisterized satellite dispenser that has one or more of the following features: fewer than four guiderails, preloaded contact with the satellite, a rectangular profile in each dimension, a dispensing mechanism that does not use a coil spring, and an inner profile that allows further supporting contact with the canisterized satellite.

These advantages, and others, can be realized by a canisterized satellite dispenser that includes one or more of: a pair of guide channels that eliminate the requirement of a rectangular profile for the satellite; a preload system that secures the canisterized satellite during transport and launch, and releases to dispense the canisterized satellite; a constant-force spring to provide a uniform and predictable dispensing force; an external rectangular profile in each dimension; and internal support surfaces that simplify the design of canisterized satellites, particularly those with deployable components. Each canisterized satellite includes a pair of opposing flanges on a lower portion of the satellite that ride in a channel formed by the dispenser's guide rails and restraining flanges; no other support constraints are imposed. During travel and launch, the satellite flanges are held against the restraining flanges, rigidly fixing the satellite to the dispenser until the satellite is deployed.

BRIEF DESCRIPTION OF THE DRAWINGS

The invention is explained in further detail, and by way of example, with reference to the accompanying drawings wherein:

FIGS. 10A-10C illustrate an example arrangement that dampens motion of the door as it opens, and prevents the door from bouncing back into the path of the payload.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

The invention is presented using an example set of different sized satellite dispensers with features associated with this invention. One of skill in the art will recognize that the features associated with this invention are substantially independent of the size or shape of the particular satellite dispenser.

Figures 1A, 1B:
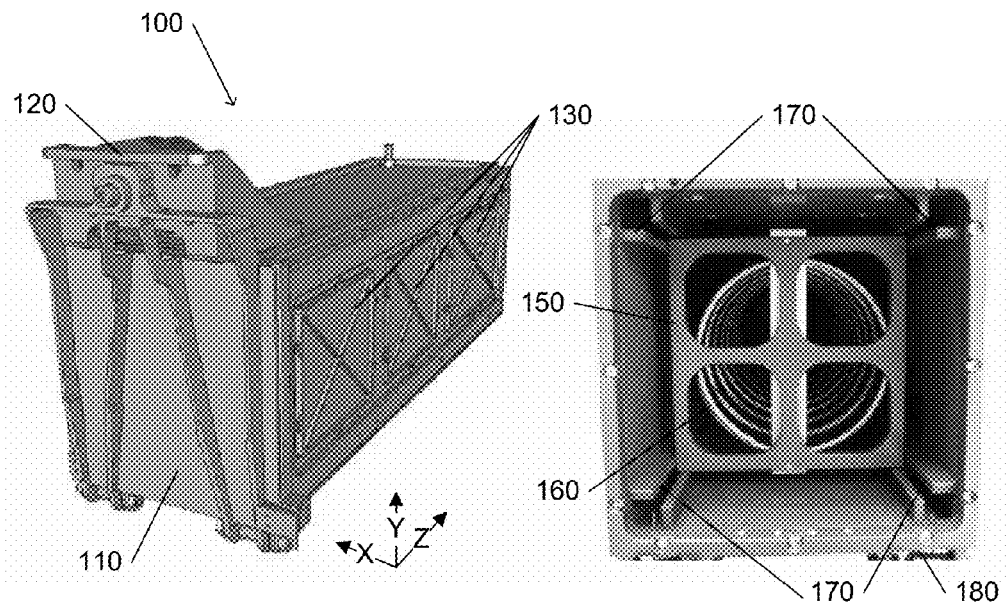
FIGS. 1A-1B illustrate a conventional dispenser for Cube-Sats.
Figure 2:
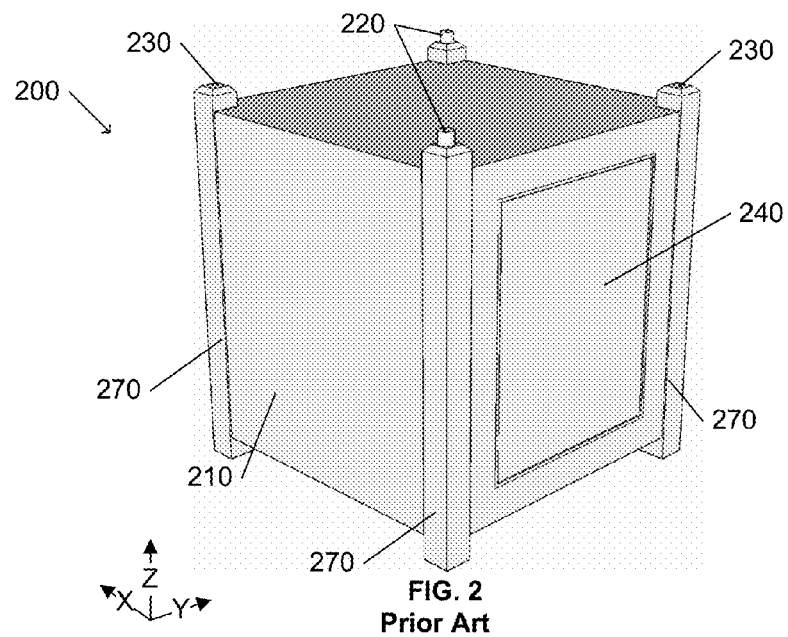
FIG. 2 illustrates a conventional CubeSat payload.
Figure 3:
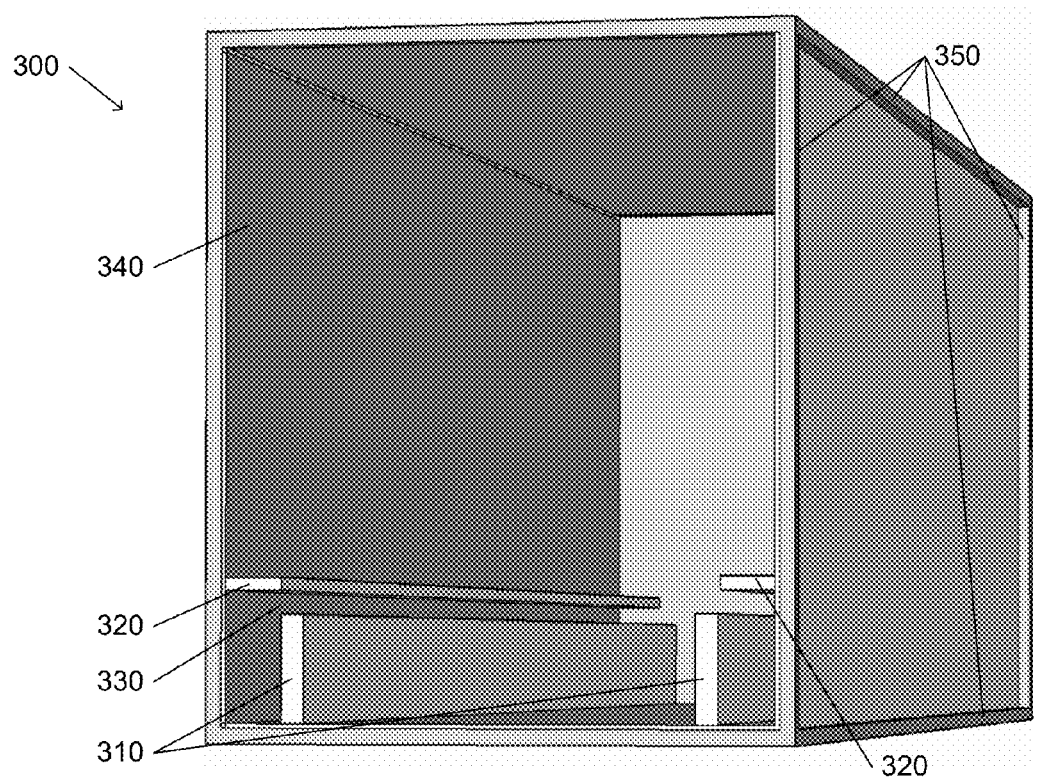
FIG. 3 illustrates an example dispenser in accordance with an aspect of this invention.
Figure 4:
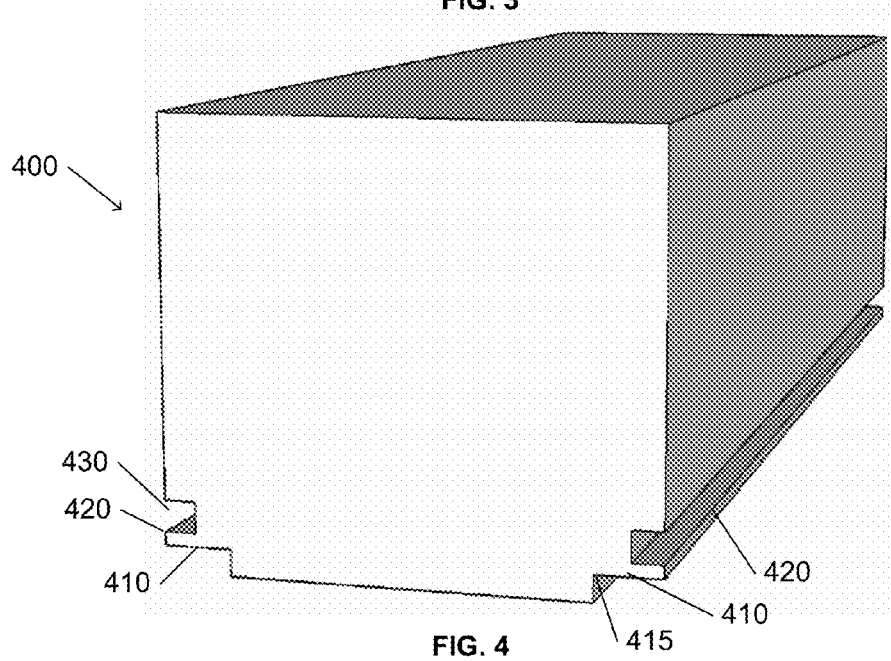
FIG. 4 illustrates an example payload in accordance with an aspect of this invention.

FIG. 3 illustrates an example dispenser 300 in accordance with an aspect of this invention, and FIG. 4 illustrates a corresponding payload satellite 400. In this example, the dispenser 300 is a "3U" configuration that, like the P-Pod 100 of FIG. 1, is able to accommodate three "1U" payloads, a "1U" payload and a "2U" payload, or a "3U" payload. The example payload 400 is a "3U" payload.

As illustrated in FIG. 3, the example dispenser 300 includes guide rails 310 that guide the payload as it is dispensed (detailed below), and restraining flanges 320 that serve to restrain a payload 400 in transit and in flight. The payload 400 of FIG. 4 illustrates a pair of flanges, or tabs 420 that are configured to lie under the pair of flanges 320 of the dispenser 300, in the channels 330 formed by the guide rails 310 and the restraining flanges 320. The flanges 420 of the payload 400 provide a slot 430 that accommodates the flange 320 of the dispenser 300. A door, not illustrated, for the dispenser 300 is hinged at the lower portion of the dispenser 300, and is arranged such that, when opened at 90 degrees, the surface of the door is below the height of the guide rails 310, allowing the payload 400 to be deployed. The guide rails 310 may be configured to support the door.

Because the payload 400 uses flanges 420 that travel atop the guide rails 310, below the restraining flanges 320, further attachment means are not required, and thus the dispenser 300 need not be further constrained to guide the payload 400 as it is being dispensed. This two-track constraint also allows the portion of the payload 400 above the flanges 420 to be arbitrarily shaped, eliminating the cubic profile requirement of CubeSat. The flat sidewalls 340 allow the payload 400 to use the sidewalls 340 for constraining deployable components of the payload 400, as detailed further below.

Figure 5:
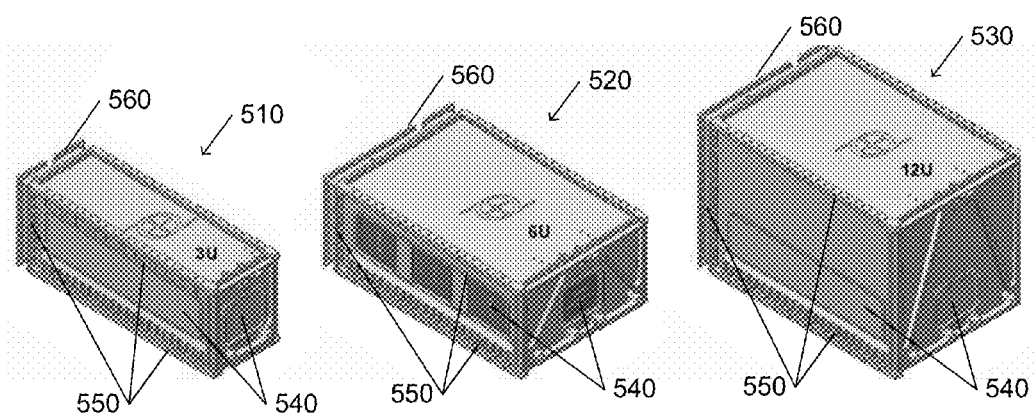
FIG. 5 illustrates example sizes of dispensers in accordance with an aspect of this invention.
Figure 6:
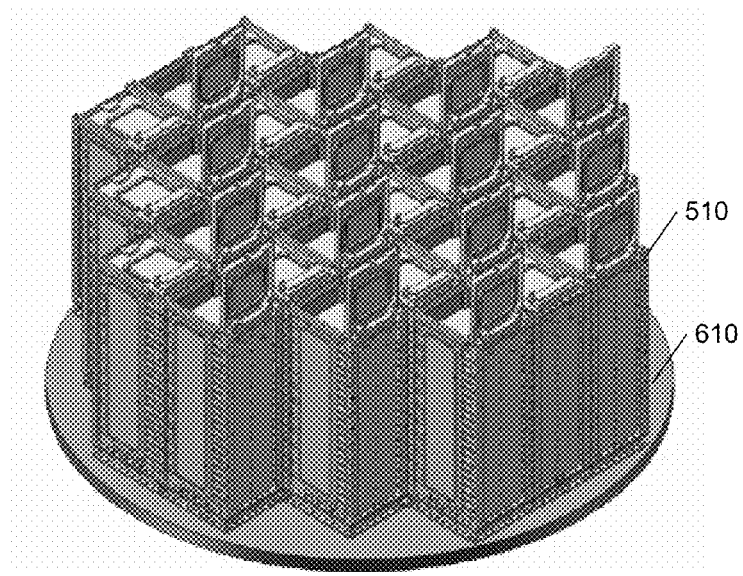
FIG. 6 illustrates an example combination of dispensers in accordance with an aspect of this invention.

The rectangular exterior of the dispenser 300 and the siderails 350 allow the dispenser 300 to be mounted in the delivery vehicle in a variety of configurations, as illustrated further in FIGS. 5 and 6.

FIG. 5 illustrates three example sizes of the dispenser. Dispenser 510 is a "three-unit" ("3U") dispenser; dispenser 520 is a double-wide "6U" dispenser; and dispenser 530 is a double-wide and double-high "12U" dispenser. In this case, the designations "6U" and "12U" are volumetric designations. The "6U" dispenser 520 and "12U" dispenser 530 require each payload to be about twice the width of the standard payload of the "3U" dispenser 510, while the "12U" dispenser 530 allows for payloads twice as tall as the standard payload of the "3U" and "6U" dispensers 510, 520.

Each of these dispensers include siderails 550 and rear support flange 560 that may be used to attach the dispenser to the delivery vehicle, to each other, to intermediate mounting plates, and so on. Access panels 540 on the sides of the payload and on the door enable access to the payload after it is loaded into the dispenser. Not illustrated, the rear section of the dispenser includes connectors/sockets for communications with the delivery vehicle, to communicate status and to receive deployment commands. Also, the door face of each dispenser may include provisions to mount to the delivery vehicle.

FIG. 6 illustrates the mounting of thirty "3U" dispensers 510 on a conventional 41" diameter mounting plate, commonly used for mounting elements to a launch vehicle. Structural integrity is enhanced by bolting adjacent dispensers 510 to each other using the side rails 550.

Figure 7:
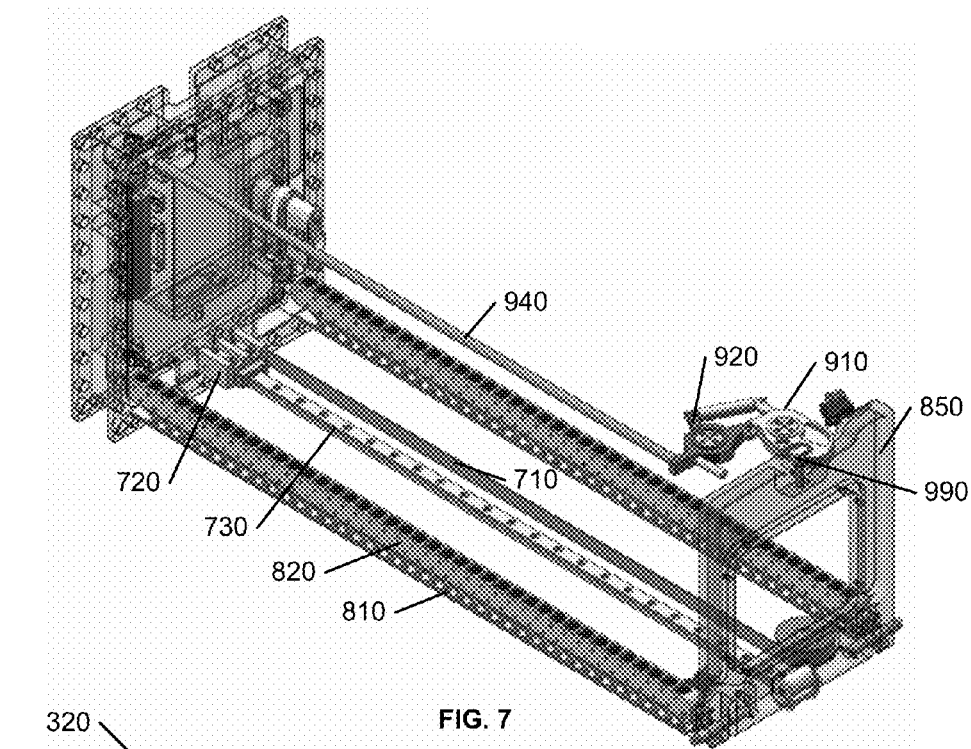
FIG. 7 illustrates example features for inclusion in dispensers in accordance with multiple aspects of this invention.

FIG. 7 illustrates example features for inclusion in dispensers in accordance with multiple aspects of this invention. For ease of reference, the initial digit in the reference numerals indicate which figure the feature is introduced; that is, for example, the elements 910-990 are detailed in the description of FIG. 9.

Of particular note, the dispensers of this invention preferable use one or more constant-force springs 710, such as a wound steel band. As contrast to the coil of the P-Pod, a constant-force spring 710 does not obey "Hooke's law", which states that that the force provided by a compressed spring is proportion to the compressed distance. That is, in the P-Pod case, maximum force is exerted when the coiled spring is initially released, and this force decreases linearly as the coil expands to deploy the payload.

In a wound steel band, similar to a tape-measure, the spring is relaxed when it is fully rolled up. As it is unrolled, the restoring force comes primarily from the portion of the ribbon near the roll. Because the geometry of that region remains nearly constant as the spring unrolls, the resulting force is substantially constant.

Although a wound band is illustrated in FIG. 7, a conical spring can be situated in the rear of the dispenser, similar to the coil spring of P-Pod, but having a variable pitch. Putting a larger pitch in the larger coils and a smaller pitch in the smaller coils of the conical spring will force the spring to expand all the coils at the same rate when released. However, a conical spring, like the coil spring of P-Pod, may introduce an undesirable torque as it unwinds. Further, clock springs, connected to the ejection plate via cables may be used in place of the constant force spring.

The constant-force spring 710 is coupled to a push-plate guide 720 that rides on a rail 730. The guide 720 is attached to a push-plate (not illustrated) that is pushed to the rear of the dispenser as the payload is inserted, extending the steel band of the spring 710. During deployment, the push-plate urges the payload out the door (not illustrated) as the push-plate guide 720 is retracted by the spring 710. As noted above (FIGS. 3 and 4), the payload is guided via the travel of the flange 420 within the channel formed by the rail 310 and flange 320.

In accordance with another aspect of this invention, the flanges 320 and 420 may be used to secure the payload to the dispenser until it is deployed.

Figures 8A, 8C:
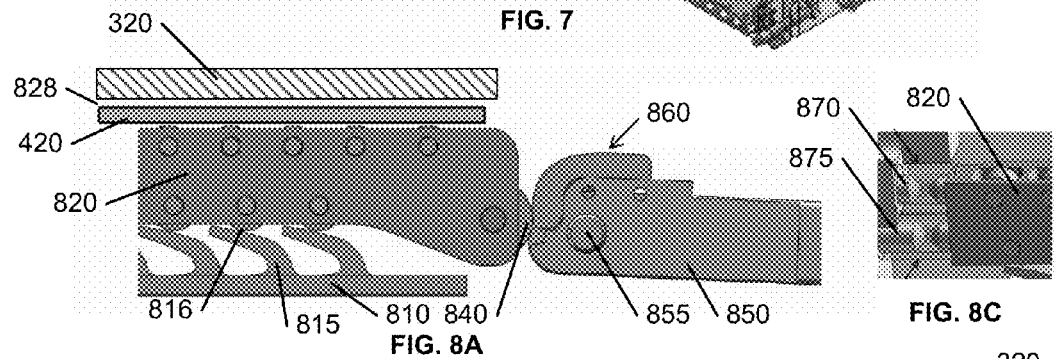
FIGS. 8A-8D illustrate an example preload system that secures an example payload to an example dispenser.
Figure 8B:
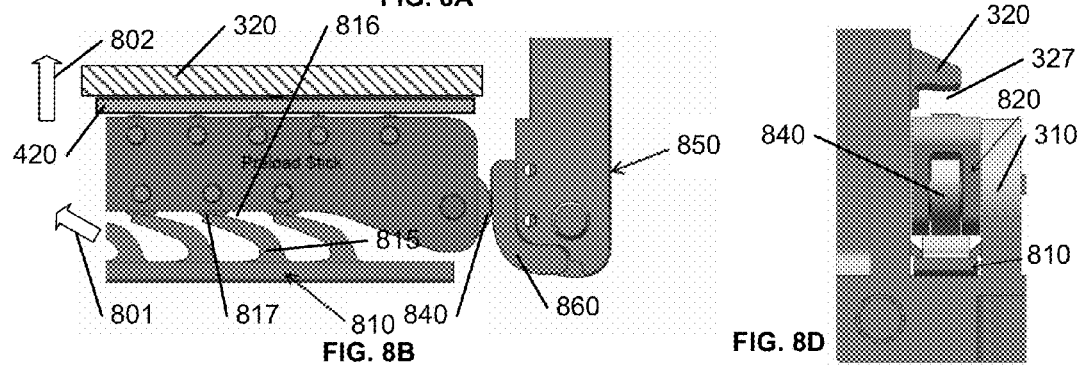
Figure 8D:
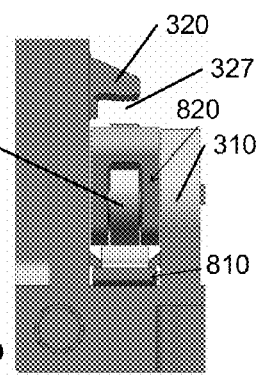

FIGS. 8A-8D illustrate an example preload system that secures the payload to an example dispenser. A preload bar 820 and flexure element 810 are situated in the space below the flange 320 in the dispenser, as illustrated in FIG. 8D, with a gap 327 below the flange 320 sufficient to accommodate the flange 420 of the payload.

FIG. 8A illustrates a lateral view of the region below the flange 320 when the preload bar 820 is in the release state, when the door 850 is open, for loading and deploying the payload. As illustrated, in this state, there is a gap 828 between the flange 320 on the dispenser and flange 420 on the payload; this gap allows the payload to freely travel below the flange 320.

The preload bar 820 is situated upon a flexure element 810 that includes sloped flexure members 815. These members 815 are substantially rigid, but are shaped to allow some bending under pressure, to accommodate slight variations in the thickness of flange 420. In the release state, the preload bar 820 will contact the members 815 at some point, designated 816 in FIG. 8A, on the sloped portion of each member 815. This point 816 is determined by the lateral location of the preload bar 820 when the door 850 is open. As detailed further below, springs 870, 875 (FIG. 8C) at the rear of the dispenser urge the preload bar 820 toward the door, as does the slope of the flexure members 815. The point 816 on the flexure member 815 should be situated such that the aforementioned gap 828 is available when the payload flange 420 is situated below the dispenser flange 320.

The door 850 includes a cam 860 that is in contact with a roller 840 on the preload bar 820. As the door 850 is closed, the cam 860 urges the preload bar 820 toward the rear of the dispenser. As the preload bar 820 travels toward the rear, the sloped flexure members 815 cause the preload bar 820 to rise, reducing the gap 828 between the payload flange 420 and the dispenser flange 320.

FIG. 8B illustrates the secured state, when the door 850 is closed. As illustrated, the preload bar 820 has been moved to point 817 on the flexure member 815, farther up the member 815 than the point 816 of the released state. In the secured state, the gap 828 between the flanges 420, 320 is eliminated, and the payload flange 420 is secured against the dispenser flange 320 by the upward force exerted on the preload bar 820 by the flexure members 815.

As noted above, FIG. 8C illustrates two springs 870 and 875 that urge the preload bar 820 toward the door. Spring 870 is a high force spring (~20 lbf) with a short travel that is used to overcome bearing stiction, whereas spring 875 is a low force spring (~10 lbf) with a longer travel that is used to keep the door open and the flexure members 815 unloaded, and to prevent payload seizure.

Of particular note, the preload system operates in a bistable manner (released and secured states), such that no external force is required to maintain the system in either state. When the door 850 is open, the configuration of the roller 840 and the cam 860 prevents the door 850 from swinging closed, keeping the preload system in the released state. To transition to the secured state, an external force is required to rotate the door 850. As detailed below, a latching system secures the door 850 in the closed position of FIG. 8B, and the external force can be removed. When the door latch is released, the movement of the preload bar 820 urges the door outward, and the configuration of the roller 840 and the cam 860 forces the door to continue to the fully open position of FIG. 8A.

Also of note, the opened state maintains the door at 90°, allowing the payload to be ejected without interference, and also allowing dispensers to be positioned adjacent each other without one dispenser's door interfering with the ejection of payloads from other dispensers.

Figure 9A:
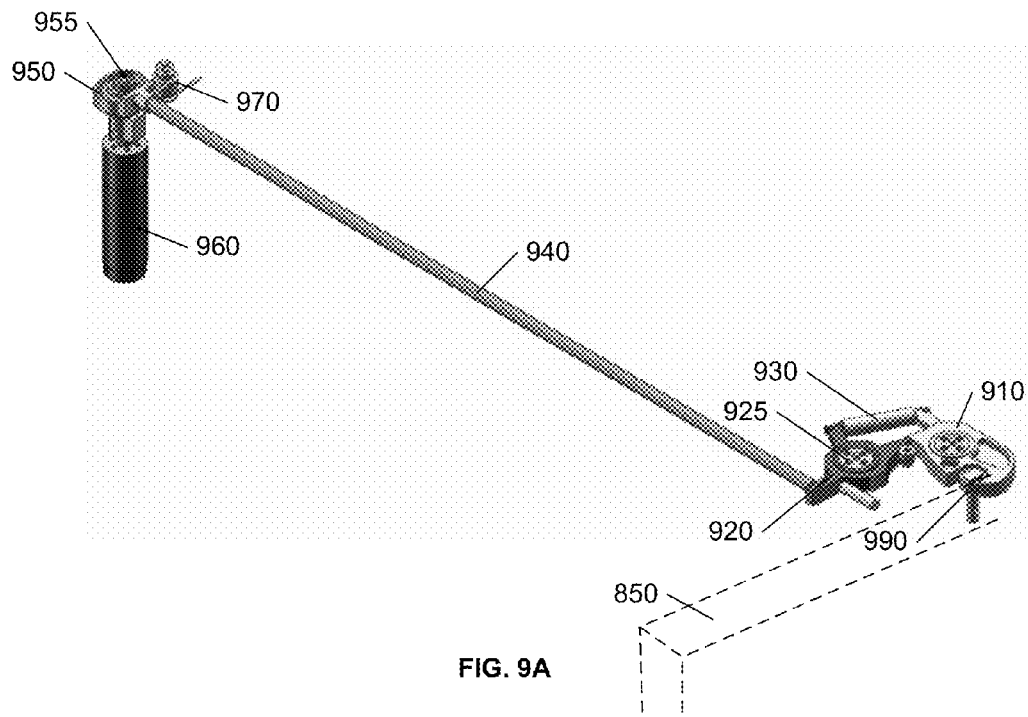
FIGS. 9A-9D illustrate an example latching system that secures a door of the dispenser.

FIGS. 9A-9D illustrate the operation of the example latching system that secures the door of the dispenser. As illustrated in FIG. 9A, the latching system includes a latch 910 that catches a latch element 990 that is situated on the upper portion of the door 850 (partially illustrated by dotted lines), opposite the hinged portion of the door 850. The latch element 990 may, for example, be a bearing, a tab, a rod, a shaft, and so on. When secured in the latch 910, the latch element 990 cannot move, holding the door 850 shut. This latch and latch element arrangement is commonly used in automobile trunks and engine hoods.

In this example, a motor 960 rotates a cam 950 about a bearing 955. To unlatch the door, the rotation of the cam 950 urges an actuator rod 940 toward the door, and this lateral movement of the rod 940 causes a rotation of a latch lock 920 about a bearing 925, which causes the latch 910 to be released, as detailed in FIGS. 9B-9D. A torsion spring 970 is coupled to the rod 940 and holds the rod 940 against the cam 950, so that shock and vibrations will not cause an accidental release of the latch 910.

Figures 9B, 9C, 9D:
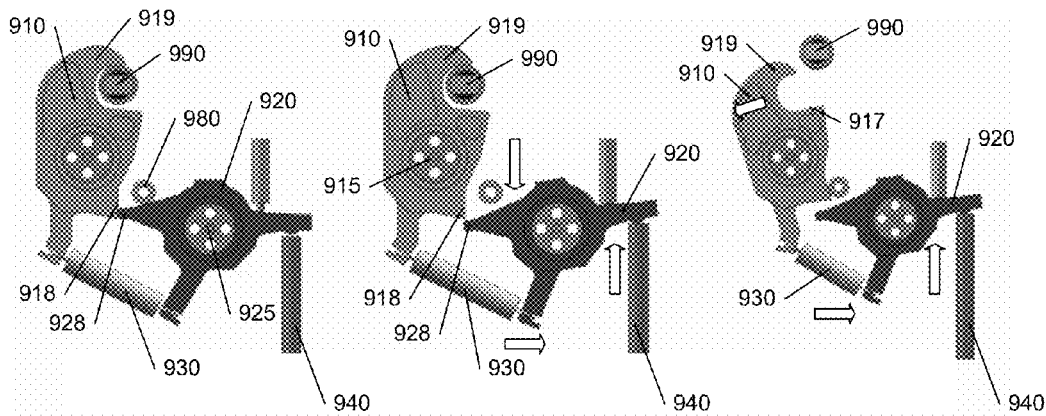

FIG. 9B illustrates the configuration of the latch 910 and the latch lock 920 while the door is in the latched state. The latch 910 includes a hook-like feature 919 that serves to engage the latch element 990, preventing an outward (upward in FIG. 9B) movement of the latch element 990, securing the door in a closed position.

The latch 910 includes a surface 918 and latch lock 920 includes a feature 928 that rests against this surface 918, maintaining the latch in the latched state without external forces being applied. A stop element 980 prevents a further clockwise rotation of the latch lock 920 in the latched state. A spring 930 urges the lower portions of the latch 910 and latch lock 920 together, holding the feature 928 in the latch lock 920 against the surface 918, preventing the rotation of the latch 910.

FIG. 9C illustrates a transition from the latched state to the released state, in response to the lateral movement of the actuator rod 940. As the rod 940 moves toward the door (upward in FIGS. 9B-9D), it forces the latch lock 920 to rotate (counterclockwise in FIG. 9B). This rotation causes the feature 928 to move off the surface 918 of the latch 910. Once released, the spring 930 pulls the latch 910 in a counterclockwise direction about bearing 915, urging the feature 919 away from the latch element 990.

FIG. 9D illustrates the configuration of the latch 910 and latch lock 920 when the latching system is in the released state. The continued counterclockwise rotation of the latch 910 results in the release of the latch element 990 from the feature 919 of the latch 910. Once released, the door swings open due to the lateral force of the preload bar 820 against the cam 860 of the door 850 (FIG. 8B). In this state, the spring 930 serves to hold the latch 910 in the open state, while the continued rotation of the cam 950 (FIG. 9A) returns the actuator rod 940 to its original lateral position of FIG. 9B.

The closing of the door causes the latching system to re-enter the latched state of FIG. 9B. As the door is closed, the latch element 990 strikes the latch 910 at the surface 917, which causes a clockwise rotation of the latch 910. Continued closing pressure continues to rotate the latch 910 such that the latch feature 919 captures the latch element 990. The spring 930 urges the lower portions of the latch lock 920 and latch 910 together, causing the feature 928 on the latch lock to be positioned on the surface 918 on the latch 910, locking the latch in the closed state of FIG. 9B.

As with the preload system, the illustrated latching system operates in a bistable manner, such that in each state, the latched state and the released state, the system will remain in that state unless and until another force is applied. Accordingly, no external force is required to maintain the latching system in each state. In FIG. 9B, the latched state, the feature 928 being situated upon the surface 918 keeps the latch from rotating until the actuator rod 940 applies the force to initiate the change of state to the released state. In FIG. 9C, the spring 930 prevents the rotation of the latch until the door latch element 990 applies the force to initiate the change to the latched state.

It is significant to note that in this example dispenser, the closing of the door effects both a securing of the payload in the dispenser, as well as the 'automatic' latching of the door.

FIGS. 10A-10C illustrate an example arrangement that dampens motion of the door as it opens, and prevents the door from bouncing back into the path of the payload.

FIG. 10A illustrates a portion of a dispenser 300 with the door 850 in a latched position. The door 850 is configured to pivot about an axis 1080 upon release, and includes a dampening/securing element 1010 with a flange 1020 that serves to dampen motion of the door as it opens, and prevent the door from bouncing back into the path of the payload. The dispenser 300 is illustrated with a lower exterior surface 1030, which may be the lower extreme of the dispenser 300, or a formed surface above the lower extreme of the dispenser 300.

FIG. 10B illustrates the dispenser 300 upon release of the door 850. The door 850 pivots about the axis 1080, and the flange 1020 comes in contact with the edge of the surface 1030. The tensile strength of the flange 1020 introduces a resistance to the motion of the door 850, dampening this motion.

As the door 850 continues to open, being pushed by the preload bar 820 (FIGS. 8A-8D), and the payload being urged out the door by the push-plate (not illustrated) of the dispenser 300, the flange 1020 flexes and continues to resist the clockwise motion of the door. At some point of maximum resistance, the gradient of the force exerted by the flange 1020 reverses, and the flexing of the flange 1020 contributes to the clockwise rotation of the door 850.

FIG. 10C illustrates the door 850 when it is fully opened. In this state, the flange 1020 serves to resist a counterclockwise rotation of the door 850, preventing the door 850 from bouncing back into the path of the payload being ejected (not illustrated). As in a number of features detailed above, the dampening structure 1010-1020 maintains the state illustrated in FIG. 10C without the need for external forces to be applied.

As noted above with respect to FIG. 3, an aspect of this invention is the use of flat surfaces on the walls 340 of the dispenser 300 to facilitate payloads having deployable components, such as antennas and solar panels. One of skill in the art will recognize that such flat surfaces may be provided on the 'floor' and 'ceiling' of the dispenser as well. In an example embodiment, these flat surfaces are situated slightly beyond the horizontal and vertical extents of the specified payload dimensions, and the door opening is configured to be at least as high and wide as the distance between these flat surfaces, presenting a unobstructed path for payload that rely on these surfaces.

Figures 11A, 11B:
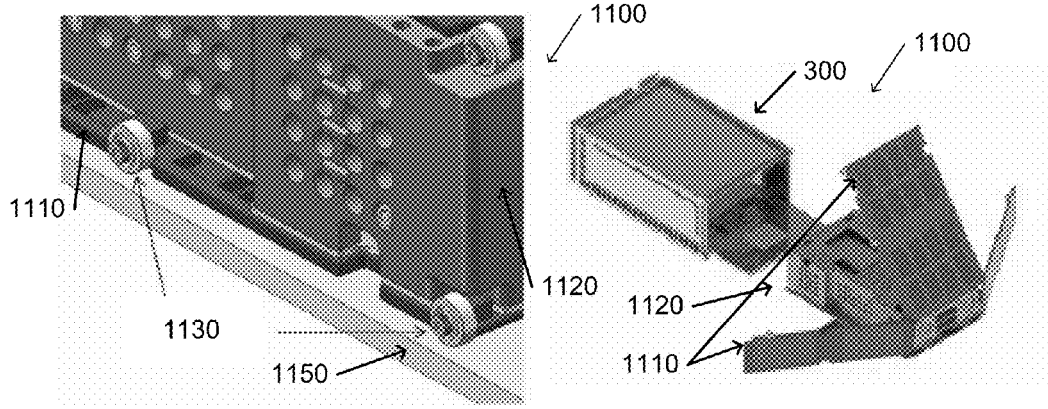
FIGS. 11A-11B illustrate an example dispenser that dispenses payloads having deployable elements.

FIGS. 11A-11B illustrate an example dispenser that dispenses payloads having deployable elements. The payload 1100 includes one or more components 1110 that are intended to be separated/deployed at least in part from the major body 1120 of the payload 1100. Typically, these components are spring-loaded for release after deployment. In a conventional payload dispenser, such as P-Pod, the payload must include the ability to restrain the deployable components 1110 while it is in the P-Pod dispenser, and include one or more sensors that detect the ejection of the payload 1100 before deploying the components 1110.

In accordance with another aspect of this invention, the smooth walls 1150 allow the payload 1100 to use these walls to support the use of deployable elements 1110 in payloads 1100. In this example embodiment, wheels, or rollers 1130 are included on the deployable component 1110 to minimize the friction as the component 1110 is rolled along the wall or ceiling smooth surface 1150 of the dispenser 300.

As the payload 1100 is ejected from the dispenser 300, the rollers 1130 roll along the smooth surface 1150 until the payload exits the dispenser 300. As illustrated in FIG. 11B, due to the spring loading of the components 1110 relative to the major body 1120 of the payload 1100, when the payload 1100 is ejected from the dispenser 300, the deployable components 1110 are deployed from the payload main body 1120.

The payload 400 of FIG. 4 appears as a solid block, and, in the P-Pod scenario, must be of rectangular shape to support the 4-sided guide rail 270 requirement of P-Pod and CubeSat. However, in accordance with another aspect of this invention, the payload 400 need not have a cubic or rectilinear profile.

Figure 12A:
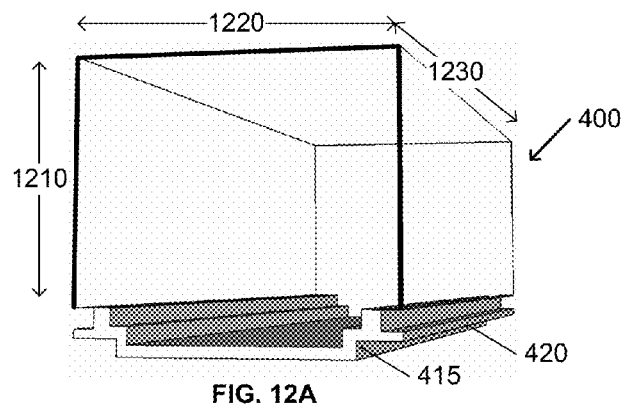
FIGS. 12A-12C illustrate the bounds associated with a payload, and example payloads having non-rectilinear shapes.
Figures 12B, 12C:
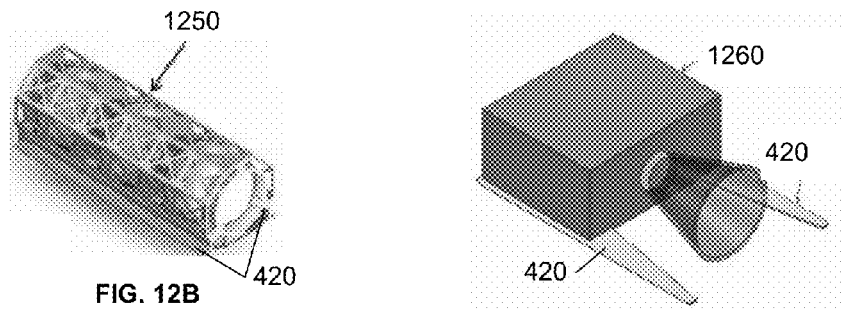

FIGS. 12A-12C illustrate the bounds associated with an example payload, and example payloads having non-rectilinear shapes.

Because the mounting, launching, and ejection of the payload 400 only requires that the payload 400 include flanges 420 that are spaced a certain distance apart (FIGS. 3-4), the remainder of the volume within the regions identified by the extent lines 1210, 1220, and 1230 may be available for as much or as little actual volume of the particular payload 400 within these extent bounds, as illustrated in FIG. 12A.

Consequently, as illustrated in FIGS. 12B and 12C, the deployable payloads of this invention may include relatively arbitrary profiles and configurations.

As illustrated in FIG. 12B, the payload 1250 is octagonal shaped, yet includes the flanges 420 required for a proper payload for the disclosed preferred embodiments provided the payload 1250 does not extend beyond the aforementioned bounds of the payload.

The payload need not occupy all, or even most of the volume of the available space, and in some embodiments may be substantially smaller than the available space, as illustrated in FIG. 12C. In such cases, the payload 1260 preferably includes 'skids'/flanges 420 that guide the payload through the channels of the dispenser 300.

Figure 13A:
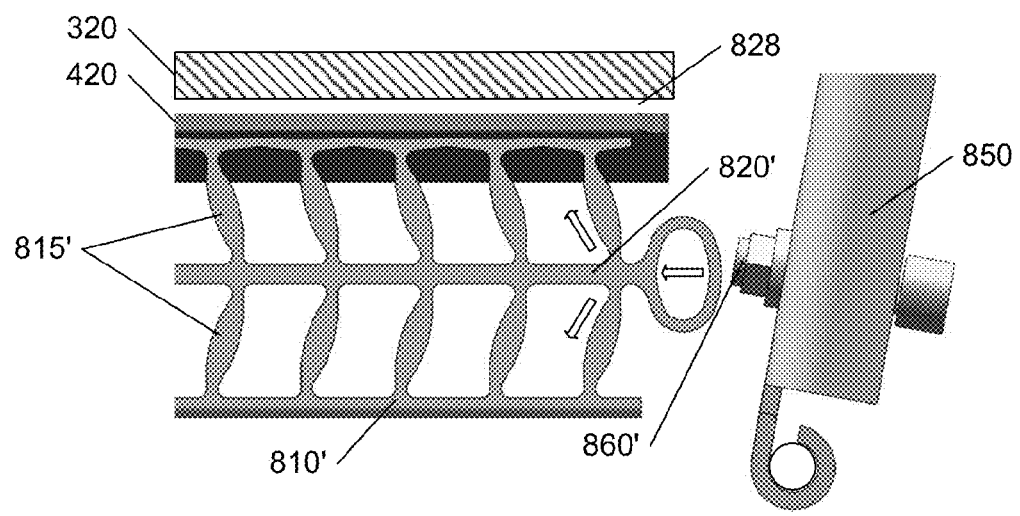
FIGS. 13A-13B illustrate an alternative preload system that secures an example payload to an example dispenser.
Figure 13B:
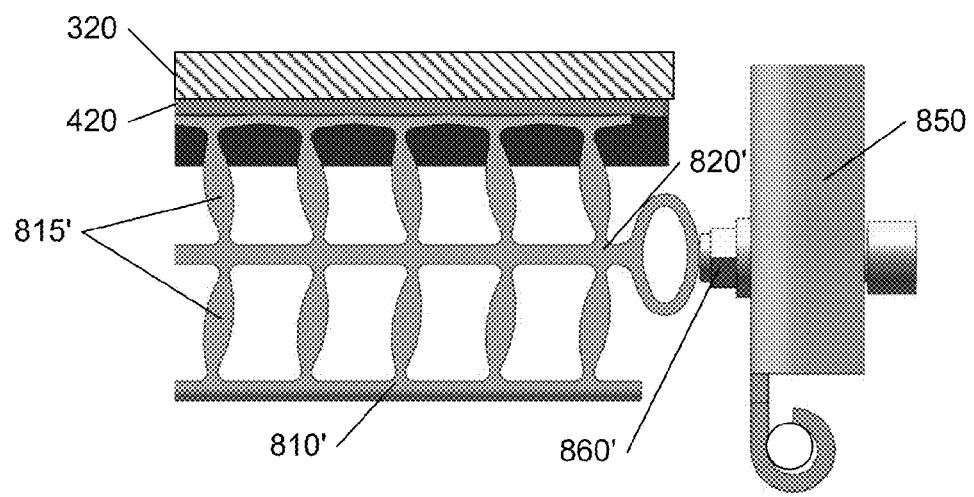

The foregoing merely illustrates the principles of the invention. It will thus be appreciated that those skilled in the art will be able to devise various arrangements which, although not explicitly described or shown herein, embody the principles of the invention and are thus within its spirit and scope. For example, FIGS. 13A-13B illustrate an alternative preload arrangement. In this arrangement, a single flexure element 810', which is fixedly attached to the floor of the canister (not shown), incorporates the functions of the flexure element 810 and the preload bar 820 of FIGS. 8A-8B. That is, the flexure element 810' includes flexure members 815' and a central preload bar 820'. When the door is open (FIG. 13A), the flexure members 815' are in a relaxed state, and a gap 828 exists between the payload flange 420 and the dispenser flange 320, allowing the payload to be inserted or ejected. When the door is closed, the element 860', which may be a screw or a bearing, acts as a cam and exerts a lateral force on the preload bar 820' of the flexure element 810', which consequently exerts an upward and downward force of the upper and lower flexure members 815', respectively. This force causes the flexure element 810 to lift the payload, via the payload flange 420, eliminating the gap 828, and clamping the payload flange 420 to the canister flange 320. This clamping force is maintained until the door is re-opened, allowing the payload to be ejected. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of a combination of hardware portions (e.g., including discrete and integrated electronic circuitry) and software portions (e.g., computer programming).

f) hardware portions may include a processor, and software portions may be stored on a non-transitory computer-readable medium, and may be configured to cause the processor to perform some or all of the functions of one or more of the disclosed elements;

g) hardware portions may be comprised of one or both of analog and digital portions;

h) any of the disclosed devices or portions thereof may be combined together or separated into further portions unless specifically stated otherwise;

i) no specific sequence of acts is intended to be required unless specifically indicated; and j) the term "plurality of" an element includes two or more of the claimed element, and does not imply any particular range of number of elements; that is, a plurality of elements can be as few as two elements, and can include an immeasurable number of elements.

We claim:

1. A dispenser for deploying one or more payloads from a delivery spacecraft, comprising:
    an enclosure for containing the one or more payloads that is configured to be secured to the delivery spacecraft, wherein the enclosure includes:
        a door through which the one or more payloads are deployed;
        a spring that is coupled to an ejection element that urges the one or more payloads out the door to deploy the one or more payloads;
        a pair of guide rails;
        a pair of restraining flanges proximate to the guide rails; and
        a preload system that is configured to apply a clamping force on corresponding flanges of a pair of flanges situated on each of the one or more payloads, to adhere the flanges of each payload to the restraining flanges of the dispenser, and to release the clamping force to enable the ejection element to urge the one or more payloads out the door;
    wherein each guide rail and proximate restraining flange of the pairs form a lateral slot to accommodate and guide the corresponding flange on each of the one or more payloads as the payload is urged out the door.

2. The dispenser of claim 1, wherein the spring is a constant force spring.

3. The dispenser of claim 1, including an ejection rail upon which the ejection element travels to urge the one or more payloads out the door.

4. The dispenser of claim 1, wherein the preload system rigidly secures the one or more payloads before deployment.

5. The dispenser of claim 1, wherein the door is configured to apply a force to the preload system to secure the one or more payloads as the door is closed.

6. The dispenser of claim 1, wherein the preload system secures and releases the one or more payloads in a bistable manner, such that when secured, or when released, the system is in one of two stable states, requiring no active force to maintain the preload system in each state.

7. The dispenser of claim 1, wherein the preload system includes a first compression spring that overcomes friction forces associated with the preload system to facilitate transition to a release state, and a second compression spring that maintains the preload system in a release state.

8. The dispenser of claim 1, wherein the preload system includes a preload rod and a flexure element that includes sloped members, such that a horizontal movement of the preload rod causes the sloped members to exert a vertical force against the preload rod to secure the one or more payloads to the restraining flange of the dispenser.

9. The dispenser of claim 1, including an internal latching system that secures and releases the door in a bistable manner, such that when engaged, or when disengaged, the system is in a stable state, requiring no active force to maintain the latching system in each state.

10. The dispenser of claim 9, wherein the latching system includes a latch element that is fixedly attached to the door, and the latching system includes a latch that engages the latch element to secure the door in a closed position.

11. The dispenser of claim 10, wherein the latching system includes a cam-driven actuator that provides the active force to disengage the latch element from the latch.

12. The dispenser of claim 11, including a motor that is configured to rotate the cam to provide the active force to the actuator to disengage the latch element from the latch.

13. The dispenser of claim 11, wherein the latching system includes a latch lock that is operably coupled between the actuator and the latch, the latch lock being configured to receive a force from a lateral movement of the actuator that rotates the latch lock so as to apply a force to the latch to release the latch element.

14. The dispenser of claim 13, wherein the latching system includes a latching spring that is operably coupled between the latch lock and the latch, and serves to rotate the latch to disengage the latch element.

15. The dispenser of claim 13, wherein the latch and latch lock include features that prevent the latch from rotating after engaging the latch element until the latch lock is rotated by the actuator.

16. The dispenser of claim 15, wherein a latching spring serves to engage the features that prevent the latch from rotating until the latch lock is rotated.

17. The dispenser of claim 9, wherein closing the door provides the active force to engage the latching system.

18. The dispenser of claim 1, including a substantially rectangular profile in each dimension to allow for at least two different arrangements for securing the dispenser to the delivery spacecraft.

19. The dispenser of claim 1, including at least one interior surface that the one or more payloads may use for one or more payload-specific functions.

20. The dispenser of claim 19, wherein the one or more payload-specific functions include deployment of one or more payload components after the payload is urged out the door.

21. The dispenser of claim 1, wherein the door includes a feature that serves to dampen motion of the door and to prevent the door from bouncing back as the payload is urged out the door.

22. The dispenser of claim 21, wherein the feature includes a flange that is under tension as it rests against a lower surface on the dispenser.

23. The dispenser of claim 1, wherein the door includes an access panel that allows access to the installed payload after the door is closed.

* * * * *